United States Patent
Azuma et al.

(10) Patent No.: US 12,387,352 B2
(45) Date of Patent: *Aug. 12, 2025

(54) DEPTH ACQUISITION DEVICE AND DEPTH ACQUISITION METHOD

(71) Applicant: Panasonic Intellectual Property Management Co., Ltd., Osaka (JP)

(72) Inventors: Takeo Azuma, Kyoto (JP); Satoshi Sato, Kyoto (JP); Nobuhiko Wakai, Tokyo (JP); Kohsuke Yoshioka, Osaka (JP); Noritaka Shimizu, Osaka (JP); Yoshinao Kawai, Kyoto (JP); Takaaki Amada, Kyoto (JP); Yoko Kawai, Osaka (JP); Takeshi Murai, Kyoto (JP); Hiroki Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,418

(22) Filed: Jul. 26, 2023

(65) Prior Publication Data

US 2024/0007727 A1 Jan. 4, 2024

Related U.S. Application Data

(63) Continuation of application No. 17/154,533, filed on Jan. 21, 2021, now Pat. No. 11,758,247, which is a
(Continued)

(30) Foreign Application Priority Data

Sep. 28, 2018 (JP) ................................ 2018-184472

(51) Int. Cl.
*G06T 7/521* (2017.01)
*G01S 17/10* (2020.01)
(Continued)

(52) U.S. Cl.
CPC .............. *G06T 7/521* (2017.01); *G01S 17/10* (2013.01); *G01S 17/89* (2013.01); *H04N 13/271* (2018.05);
(Continued)

(58) Field of Classification Search
CPC ...... H04N 5/332; H04N 13/271; G06T 7/521; G06T 2207/10028; G01S 17/10; G01S 17/89
See application file for complete search history.

(56) References Cited

U.S. PATENT DOCUMENTS

| 11,758,247 B2 * | 9/2023 | Azuma | G06T 7/136 |
| | | | 348/46 |
| 2003/0235327 A1 * | 12/2003 | Srinivasa | G06V 10/255 |
| | | | 382/104 |

(Continued)

FOREIGN PATENT DOCUMENTS

| JP | 2008-97624 | 4/2008 |
| JP | 4317300 | 8/2009 |

(Continued)

OTHER PUBLICATIONS

International Search Report issued Nov. 26, 2019 in International (PCT) Application No. PCT/JP2019/035781.
(Continued)

*Primary Examiner* — James T Boylan
(74) *Attorney, Agent, or Firm* — Wenderoth, Lind & Ponack, L.L.P.

(57) ABSTRACT

A depth acquisition device includes memory and processor performing: acquiring, from the memory, intensities of infrared light emitted from a light source and measured by imaging with the infrared light reflected on a subject by pixels in an imaging element; generating a depth image by calculating a distance to the subject as a depth for each pixel
(Continued)

based on an intensity received by the pixel; acquiring, from the memory, a visible light image generated by imaging, with visible light, a substantially same scene with a substantially same viewpoint and at a substantially same timing as those of imaging the infrared light image; detecting, from the visible light image, an edge region including an edge along a direction perpendicular to a direction of movement of the visible light image; and correcting, in the depth image, a depth of a target region corresponding to the edge region in the depth image.

9 Claims, 12 Drawing Sheets

Related U.S. Application Data continuation of application No. PCT/JP2019/035781, filed on Sep. 11, 2019.

(51) Int. Cl.
 *G01S 17/89* (2020.01)
 *H04N 13/271* (2018.01)
 *H04N 23/11* (2023.01)

(52) U.S. Cl.
 CPC .... *H04N 23/11* (2023.01); *G06T 2207/10028* (2013.01)

(56) References Cited

U.S. PATENT DOCUMENTS

| | | |
|---|---|---|
| 2009/0212113 A1 | 8/2009 | Chiu |
| 2010/0046802 A1* | 2/2010 | Watanabe ............. G01S 17/894 348/46 |
| 2010/0253597 A1* | 10/2010 | Seder .................. G01S 13/723 348/148 |
| 2012/0177252 A1 | 7/2012 | Korekado et al. |
| 2016/0078793 A1* | 3/2016 | Aimonen ............... G09G 3/006 345/589 |
| 2017/0272651 A1 | 9/2017 | Mathy |
| 2018/0136332 A1 | 5/2018 | Barfield, Jr. et al. |
| 2018/0205926 A1 | 7/2018 | Mogalapalli |
| 2018/0257225 A1 | 9/2018 | Satou |
| 2018/0348369 A1 | 12/2018 | Ohki |
| 2019/0362511 A1 | 11/2019 | Jouppi |
| 2020/0074659 A1 | 3/2020 | Nakagawa |
| 2020/0167161 A1 | 5/2020 | Planche |
| 2020/0349367 A1 | 11/2020 | Sasaki |
| 2021/0073953 A1 | 3/2021 | Lee |

FOREIGN PATENT DOCUMENTS

| | | |
|---|---|---|
| JP | 2011-64498 | 3/2011 |
| JP | 2018-149628 | 9/2018 |
| WO | 2017/145450 | 8/2017 |

OTHER PUBLICATIONS

Jiangbo Lu et al., "Cross-Based Local Multipoint Filtering", IEEE Computer Society Conference on Computer Vision and Pattern Recognition, Jun. 2012, pp. 430-437.

Dongbo Min et al., "Fast Global Image Smoothing Based on Weighted Least Squares", IEEE Transactions on Image Processing, vol. 23, No. 12, Dec. 2014, pp. 5638-5653.

Georg Petschnigg et al., "Digital Photography with Flash and No-Flash Image Pairs", ACM Transactions on Graphics, vol. 23, No. 3, Aug. 2004, pp. 664-672.

Kaiming He et al., "Guided Image Filtering", IEEE Transactions on Pattern Analysis and Machine Intelligence, vol. 35, No. 6, Jun. 2013.

Extended European Search Report issued on Jan. 27, 2022 in European Patent Application No. 19864942.8.

Office Action issued Dec. 7, 2023 in corresponding Chinese Patent Application No. 201980050152.3, with English language translation.

* cited by examiner

DEPTH ACQUISITION DEVICE AND DEPTH ACQUISITION METHOD

CROSS REFERENCE TO RELATED APPLICATIONS

This application is a continuation application of U.S. application Ser. No. 17/154,533 filed on Jan. 21, 2021 which is a U.S. continuation application of PCT International Patent Application Number PCT/JP2019/035781 filed on Sep. 11, 2019, claiming the benefit of priority of Japanese Patent Application Number 2018-184472 filed on Sep. 28, 2018, the entire contents of which are hereby incorporated by reference.

BACKGROUND

1. Technical Field

The present disclosure relates to depth acquisition devices and the like which acquire a distance to a subject of an image as a depth.

2. Description of the Related Art

Conventionally, a distance measurer for measuring a distance to a subject of image has been proposed (for example, refer to Japanese Unexamined Patent Application Publication No. 2011-64498 (PTL 1)). This distance measurer includes a light source and an imager. The light source irradiates the subject with light. The imager images the light reflected on the subject. Then, the distance measurer converts each pixel value in the image generated by the imaging into a distance to the subject, thereby measuring the distance to the subject. In other words, the distance measurer acquires a depth of the image generated by the imager.

SUMMARY

However, the distance measurer in NPL 1 has a problem of failing to accurately acquire the depth.

Therefore, the present disclosure provides a depth acquisition device capable of accurately acquiring a depth which is a distance from the depth acquisition device to a subject of image.

In accordance with an aspect of the present disclosure, a depth acquisition device includes: a memory; and a processor, wherein the processor performs: acquiring intensities of infrared light which are stored in the memory, the intensities being measured by imaging performed by receiving the infrared light reflected on a subject by respective pixels in an imaging element, the infrared light having been emitted from a light source; generating a depth image, by calculating a distance to the subject as a depth for each of the respective pixels in the imaging element, based on an intensity received by the pixel among the intensities of the infrared light; acquiring a visible light image stored in the memory, the visible light image being generated by imaging a substantially same scene as a scene of an infrared light image, with visible light from a substantially same viewpoint as a viewpoint of imaging the infrared light image at a substantially same timing as a timing of imaging the infrared light image, the infrared light image being generated by the imaging based on the intensities of the infrared light received by the respective pixels in the imaging element; detecting an edge region from the visible light image, the edge region being a region including an edge along a direction perpendicular to a direction of movement of the visible light image; and correcting a depth of a target region to be corrected in the depth image, the target region corresponding to the edge region.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

The depth acquisition device according to the preset disclosure is capable of accurately acquiring a depth which is a distance to a subject of image. Additional advantages and effects of the aspect of the present disclosure will be apparent from the Description and the Drawings. The advantages and/or effects may be individually obtained by the various embodiments and the features of the Description and the Drawings, which need to all be provided in order to obtain one or more such advantages and/or effects.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
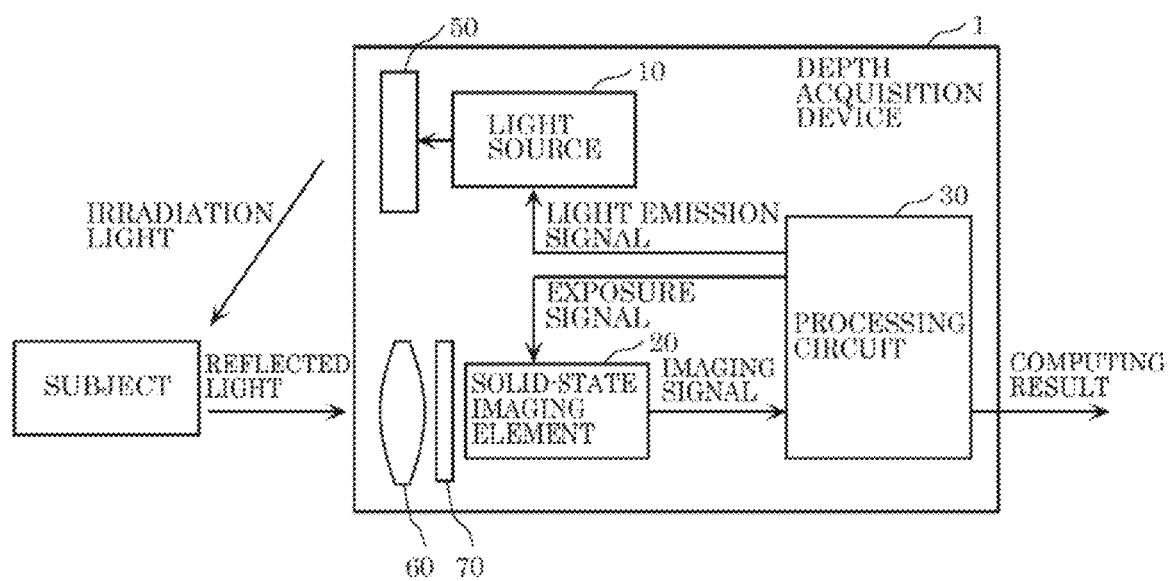
FIG. 1 is a block diagram illustrating a hardware structure of a depth acquisition device according to Embodiment.

DETAILED DESCRIPTION OF THE EMBODIMENT (Findings on which the Present Disclosure is Based)

The present inventors have found that the following problems occur in connection with the distance measurer of PTL 1 described in the "BACKGROUND ART" section.

The distance measurer of PTL 1, as described above, acquires an image by irradiating light from a light source to a subject and imaging the subject irradiated with light, and measures depth of the image. In the measurement of depth, Time of Flight (ToF) is used. In such a distance measurer, imaging at mutually different imaging conditions is performed to improve distance measurement accuracy. That is, the distance measurer performs imaging according to a predetermined imaging condition, and depending on that imaging result, sets an imaging condition different from the predetermined imaging condition. Then, the distance measurer performs imaging again according to the set imaging condition.

However, when a boundary of two objects having mutually different reflectivities of light is imaged, it is sometimes difficult for the above-described distance measurer of PTL 1 to properly measure a depth of an area around the boundary even if the imaging condition is changed.

In order to solve the above-described problem, a depth acquisition device according to an aspect of the present disclosure includes: a memory; and a processor, wherein the processor performs: acquiring intensities of infrared light which are stored in the memory, the intensities being measured by imaging performed by receiving the infrared light reflected on a subject by respective pixels in an imaging element, the infrared light having been emitted from a light source; generating a depth image, by calculating a distance to the subject as a depth for each of the respective pixels in the imaging element, based on an intensity received by the pixel among the intensities of the infrared light; acquiring a visible light image stored in the memory, the visible light image being generated by imaging a substantially same scene as a scene of an infrared light image, with visible light from a substantially same viewpoint as a viewpoint of imaging the infrared light image at a substantially same timing as a timing of imaging the infrared light image, the infrared light image being generated by the imaging based on the intensities of the infrared light received by the respective pixels in the imaging element; detecting an edge region from the visible light image, the edge region being a region including an edge along a direction perpendicular to a direction of movement of the visible light image; and correcting a depth of a target region to be corrected in the depth image, the target region corresponding to the edge region. It should be noted that a region in a depth image corresponding to an edge region is a region in a depth image, which is located in the same position as that of the edge region in a visible light image, and has the same shape and size as those of the edge region.

For example, when a boundary of two objects having mutually different reflectivities to infrared light is imaged, if the camera to be used for the imaging is moved, the reflectivity at a target position to be measured in the area around the boundary may significantly change. In such a case, noise is generated at the target position to be measured, and thereby a depth image indicating inaccurate depth will be acquired.

However, in the above-described depth acquisition device according to one aspect, a region including an edge along a direction perpendicular to the direction of movement of a visible light image is detected as the edge region from the visible light image. The edge included in this edge region corresponds to, for example, the boundary of two objects as described above. That is, the edge region is a region on which the above-described area around the boundary, where the reflectivity of infrared light is likely to change significantly during the measurement by ToF, is projected. Then, the region in the depth image corresponding to such an edge region is designated as a target region to be corrected, and the depth of the target region to be corrected is corrected so that noise is reduced and the depth of the area around the boundary can be accurately acquired.

Here, an example of an image of a substantially same scene imaged at substantially same viewpoint and time, is an image imaged by a different pixel of the same imaging element. Such an image is similar to each channel image of red, green, and blue of a color image imaged by a color filter of the Bayer array, and the angle of view, viewpoint, and imaging time of each image are approximately equal to each other. That is, in an image of a substantially same scene imaged at substantially same viewpoint and time, the position of a subject on the image does not differ by an amount of two or more pixels in each image that has been imaged. For example, if a point light source having visible light and infrared light components exists in a scene and is imaged to have a high luminance at only one pixel in the visible light image, the point light source will also be imaged in the infrared light image at a pixel at a distance of not more than two pixels from the pixel corresponding to the pixel position at which the point light source is imaged in the visible light image. Further, imaging at a substantially same time indicates that the imaging times are equal with the difference being not more than one frame.

It should be noted that the above-mentioned edge region corresponds to a light-dark boundary region. That is, the processor detects, from a visible light image, a light-dark boundary region which is a region including a boundary between two regions having mutually different luminances, the boundary lying along a direction perpendicular to the direction of movement of the visible light image. In this case, the processor corrects the depth of a target region to be corrected, which is a region in the depth image corresponding to the light-dark boundary region.

It is possible that in the detecting of the edge region, an edge having an intensity not less than a first threshold among the intensities is detected, and the edge region is a region within a distance corresponding to the movement of the visible light image from the edge having the intensity not less than the first threshold.

This makes it possible to appropriately detect the edge region. Consequently, it is possible to appropriately detect a region where noise is likely to occur in the depth image.

It is also possible that in the detecting of the edge region, a region having a difference not less than a second threshold between a pixel value of the visible light image and a pixel value of a visible light image previously generated is detected as the edge region.

This makes it possible to easily detect the edge region.

It is further possible that in the correcting of the target region, the depth of the target region is corrected in accordance with a depth of a peripheral region located at a periphery of the target region in the depth image. For example, it is further possible that the peripheral region is a region in contact with a lower side of the target region, in the correcting of the depth of the target region, the depth of the target region is replaced with the depth of the peripheral region.

It is highly likely that the depth of the peripheral region is close to the correct depth of the target region to be corrected. Therefore, by using the depth of such peripheral region, it is possible to correct the depth of the target region to be corrected, properly.

It is further possible that in the correcting of the depth of the target region, the depth of the target region is corrected by filtering the depth image with reference to the visible light image as a reference image.

For example, an extended filter of Guided Filter may be used for the filtering. This makes it possible to correct the depth of the target region to be corrected, properly.

It is further possible that in the correcting of the depth of the target region, the depth of the target region in the depth image is corrected by inputting the infrared light image, the visible light image, the depth image, and the edge region into a learning model.

As a result of this, if the learning model is trained in advance so that a correct depth image after correction is outputted for the input of the depth image, the infrared light image, the visible light image, and the edge region, it is possible to easily acquire an appropriate depth image without detecting the edge region.

In accordance with another aspect of the present disclosure, a depth acquisition device includes: a memory; and a processor, wherein the processor performs: acquiring intensities of infrared light which are stored in the memory, the intensities being measured by imaging performed by receiving the infrared light reflected on a subject by respective pixels in an imaging element, the infrared light having been emitted from a light source; generating a depth image, by calculating a distance to the subject as a depth for each of the respective pixels in the imaging element, based on an intensity received by the pixel among the intensities of the infrared light; acquiring a visible light image stored in the memory, the visible light image being generated by imaging a substantially same scene as a scene of an infrared light image, with visible light from a substantially same viewpoint as a viewpoint of imaging the infrared light image at a substantially same timing as a timing of imaging the infrared light image, the infrared light image being generated by the imaging based on the intensities of the infrared light received by the respective pixels in the imaging element; and correcting a depth of the depth image by inputting the depth image, the infrared light image, and the visible light image into a learning model.

As a result of this, if the learning model is trained in advance such that the correct depth image after correction is outputted for the input of the depth image, the infrared light image, and the visible light image, it is possible to easily acquire an appropriate depth image without having detecting the edge regions.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof. The recording medium may be a non-transitory recording medium.

Hereinafter, an embodiment will be described in detail with reference to the accompanying Drawings.

It should be noted that the following embodiment is a general or specific example of the present disclosure. The numerical values, shapes, materials, elements, arrangement and connection configuration of the elements, steps, the order of the steps, etc., described in the following embodiment are merely examples, and are not intended to limit the present disclosure.

It should also be noted that the respective figures are schematic diagrams and are not necessarily precise illustrations. Additionally, components that are essentially the same share like reference signs in the figures.

EMBODIMENT

[Hardware Configuration]

FIG. 1 is a block diagram illustrating a hardware configuration of depth acquisition device 1 according to Embodiment. Depth acquisition device 1 according to the present embodiment has a hardware configuration which is capable of acquiring an image based on infrared light (or near infrared light) and an image based on visible light by imaging of a substantially same scene, the imaging being performed at a substantially same viewpoint and imaging time. It should be noted that substantially same means "the same to the extent that the effects in the present disclosure can be achieved."

As shown in FIG. 1, depth acquisition device 1 is configured to include light source 10, solid-state imaging element 20, processing circuit 30, diffusion plate 50, lens 60, and band-pass filter 70.

Light source 10 irradiates irradiation light. More specifically, light source 10 emits irradiation light to be irradiated to a subject at a timing indicated by a light emission signal generated in processing circuit 30.

Light source 10 is configured to include, for example, a capacitor, a driving circuit, and a light emitting element, and emits light by driving the light emitting element with electric energy accumulated in the capacitor. The light emitting element is implemented by, as an example, a laser diode, a light emitting diode, and the like. It should be noted that light source 10 may be configured to include one kind of light emitting element, or configured to include plural kinds of light emitting elements according to purposes.

Hereinafter, the light emitting element is, for example, a laser diode that emits near infrared light, or a light emitting diode that emits near infrared light, or the like. However, the irradiation light irradiated by light source 10 may be infrared light (also referred to as infrared ray) of a frequency band other than near infrared light. Hereinafter, in the present embodiment, although the irradiation light irradiated by light source 10 will be described as infrared light, the infrared light may be near infrared light, or infrared light of a frequency band other than that of near infrared light.

Solid-state imaging element 20 images a subject and outputs an imaging signal indicating an exposure amount. To be more specifically, solid-state imaging element 20 performs exposure at a timing indicated by an exposure signal generated in processing circuit 30, and outputs an imaging signal indicating an exposure amount.

Solid-state imaging element 20 has a pixel array in which a first pixel that performs imaging with reflected light, which is irradiation light reflected by a subject, and a second pixel that images the subject are disposed in an array. Solid-state imaging element 20 may have, for example, as needed, cover glass, and a logic function such as an A/D converter, etc.

Hereinafter, as with the irradiation light, description will be made supposing that the reflected light is infrared light. However, the reflected light does not need to be limited to infrared light provided that the light is irradiation light reflected by a subject.

Figure 2:
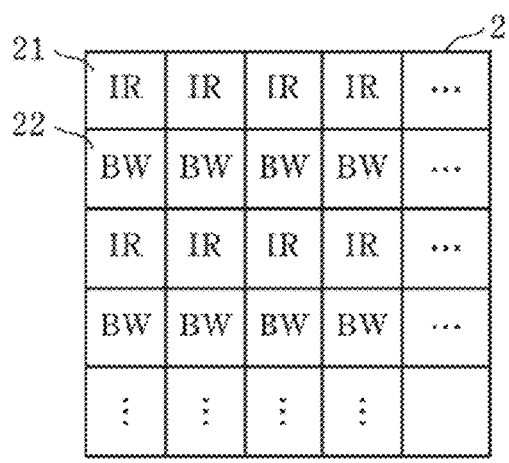
FIG. 2 is a schematic diagram illustrating a pixel array in a solid-state imaging element according to Embodiment.

FIG. 2 is a schematic diagram illustrating pixel array 2 included in solid-state imaging element 20.

As shown in FIG. 2, pixel array 2 is configured to be disposed in an array pattern such that first pixel 21 (IR pixel) that performs imaging with reflected light, which is irradiation light reflected by a subject, and second pixel 22 (BW pixel) that images the subject are alternately aligned in columns.

Moreover, in FIG. 2, although second pixel 22 and first pixel 21 are arranged to be adjacent to each other in the row direction and are disposed to be aligned in a stripe pattern in the row direction, in pixel array 2, this is not limiting and they may be disposed every multiple rows (every two rows, for example). That is, the first row in which second pixels 22 are arranged to be adjacent to each other in the row direction, and the second row in which first pixels 21 are arranged to be adjacent to each other in the row direction may be disposed alternately every M rows (M is a natural number). Further, the first row, in which second pixels 22 are arranged to be adjacent to each other in the row direction, and the second row, in which first pixels 21 are arranged to be adjacent to each other in the row direction, may be disposed every different number of rows (N rows of the first row and L rows of the second row are alternately repeated (N and L are different natural numbers)).

First pixel 21 is implemented by, for example, an infrared light pixel sensitive to infrared light which is the reflected light. Second pixel 22 is implemented by, for example, a visible light pixel sensitive to visible light.

The infrared light pixel is configured to include, for example, an optical filter (also called as an IR filter) which transmits only infrared light, a micro lens, a light receiving element as a photoelectric converter, and an accumulator that accumulates electric charge generated at the light receiving element. Therefore, an image indicating the luminance of infrared light is represented by an imaging signal outputted from a plurality of infrared light pixels (that is, first pixel 21) included in pixel array 2. Hereinafter, this image of infrared light is also referred to as IR image or infrared image.

Moreover, the visible light element is configured to include, for example, an optical filter (also called as a BW filter) which transmits only visible light, a micro lens, a light receiving element as a photoelectric converter, and an accumulator that accumulates electric charge converted at the light receiving element. Therefore, the visible light pixel, that is, second pixel 22, outputs an imaging signal indicating luminance and color difference. That is, a color image that indicates luminance and color difference of visible light is represented by an imaging signal outputted from a plurality of second pixels 22 included in pixel array 2. It should be noted that the optical filter of visible light pixel may transmit both visible light and infrared light, or may transmit only light of a specific wavelength such as red (R), green (G), or blue (B) of visible light.

Moreover, the visible light pixel may detect only the luminance of visible light. In this case, the visible light pixel, that is, second pixel 22, outputs an imaging signal indicating luminance. Therefore, a pixel of black and white that indicates the luminance of visible light, in other words, a monochrome image is represented by an imaging signal outputted from a plurality of second pixels 22 included in pixel array 2. This monochrome image is hereinafter referred to as a BW image. It should be noted that the above-described color image and the BW image are collectively referred to as a visible light image.

Referring back to FIG. 1 again, description of depth acquisition device 1 will be continued.

Processing circuit 30 computes subject information relating to a subject by using the imaging signal outputted by solid-state imaging element 20.

Processing circuit 30 is constituted by, for example, an arithmetic processing unit such as a microcomputer. The microcomputer includes a processor (microprocessor), a memory, etc. and generates a light emitting signal and an exposure signal by the processor executing a driving program stored in the memory. It should be noted that processing circuit 30 may use PGA or ISP, etc. and may be constituted by one hardware or multiple hardware.

Processing circuit 30 calculates distance to a subject by, for example, a TOF distance measurement method which is performed by using the imaging signal from first pixel 21 of solid-state imaging element 20.

Hereinafter, referring to the drawings, calculation of distance to a subject by the TOF distance measurement method performed by processing circuit 30 will be described.

Figure 3:
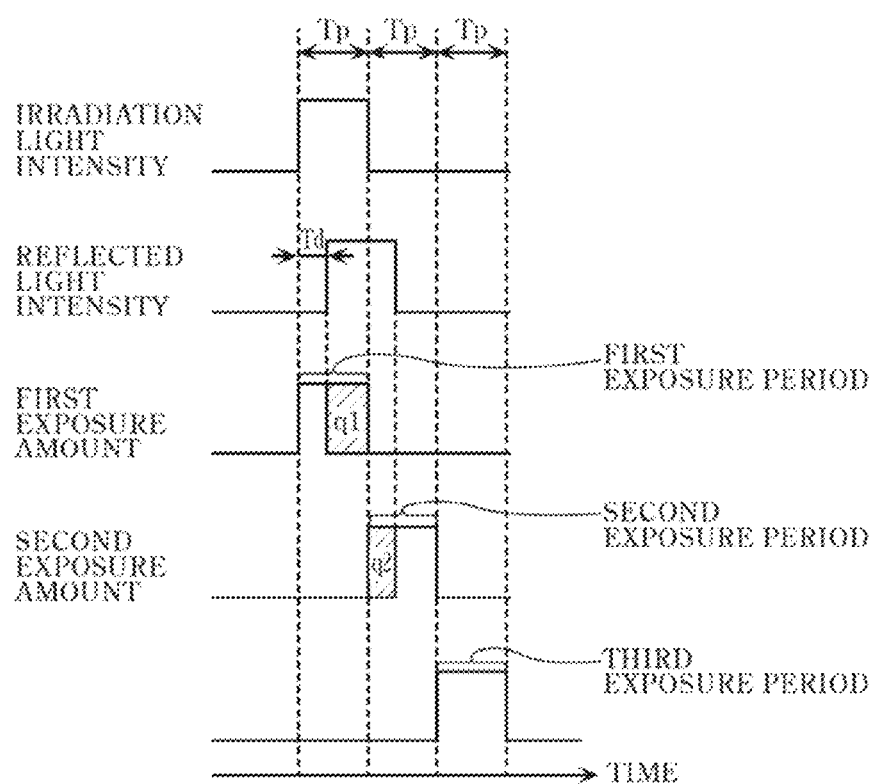
FIG. 3 is a time chart illustrating a light emitting timing of a light emitting element of a light source and exposure timings of a first pixel in the solid-stage imaging element according to Embodiment.

FIG. 3 is a time chart illustrating a relationship between the light emitting timing of the light emitting element of light source 10 and the exposure timing of first pixel 21 of solid-state imaging element 20 when processing circuit 30 calculates a distance to a subject by using the TOF distance measurement method.

In FIG. 3, Tp is a light emission period during which a light emitting element of light source 10 emits irradiation light, and Td is a delay time from when the light emitting element of light source 10 emits the irradiation light until when reflected light which is the irradiation light reflected by a subject returns to solid-state imaging element 20. And the first exposure period is at the same timing at that of the light emission period during which light source 10 emits irradiation light, and the second exposure period is timing from the end time point of the first exposure period until an elapse of the light emission period Tp.

In FIG. 3, q1 indicates a total amount of exposure amount in first pixel 21 of solid-state imaging element 20 by the reflected light in the first exposure period, and q2 indicates a total amount of exposure amount in first pixel 21 of solid-state imaging element 20 by the reflected light in the second exposure period.

By performing light emission of irradiation light by the light emitting element of light source 10 and exposure by first pixel 21 of solid-state imaging element 20 at a timing shown in FIG. 3, it is possible to represent a distance d to a subject by the following (Equation 1) with c as the speed of light.

$$d = c \times Tp/2 \times q2/(q1+q2) \qquad \text{(Equation 1)}$$

Therefore, processing circuit 30 can calculate the distance to a subject by using an imaging signal from first pixel 21 of solid-state imaging element 20 by using (Equation 1).

Further, a plurality of first pixels 21 of solid-state imaging element 20 may be exposed for a third exposure period Tp after the end of the first exposure period and the second exposure period. The plurality of first pixels 21 can detect noises other than reflected light by the exposure amount obtained in the third exposure period Tp. That is, processing circuit 30 can more accurately calculate the distance d to a subject by deleting noises respectively from exposure amount q1 in the first exposure period and exposure amount q2 in the second exposure period, in the above-described (Equation 1).

Referring back to FIG. 1 again, description of depth acquisition device 1 will be continued.

Processing circuit 30 may perform detection of a subject, and calculation of the distance to the subject by using imaging signals from, for example, second pixel 22 of solid-state imaging element 20.

That is, processing circuit 30 may perform detection of a subject and calculation of a distance to the subject based on visible light image imaged by a plurality of second pixels 22 of solid-state imaging element 20. Here, the detection of a subject may be implemented by, for example, performing discrimination of shape by pattern recognition through edge detection of a singular point of the subject, or may be implemented by processing such as Deep Learning by using a learning model trained in advance. Further, calculation of a distance to the subject may be performed by using global coordinate transformation. As a matter of course, detection of a subject may be implemented by multi-modal learning process by using not only visible light image, but also luminance and distance information of infrared light imaged by first pixel 21.

Processing circuit 30 generates a light emission signal indicating the timing of light emission, and an exposure signal indicating the timing of exposure. Then, processing circuit 30 outputs the generated light emission signal to light source 10, and outputs the generated exposure signal to solid-state imaging element 20.

Processing circuit 30 may make depth acquisition device 1 implement continuous imaging at a predetermined frame rate, for example, by generating and outputting a light emission signal so as to make light source 10 emit light on a predetermined cycle, and generating and outputting an exposure signal so as to expose solid-state imaging element 20 on a predetermined cycle. Moreover, processing circuit 30 includes, for example, a processor (microprocessor), a memory, and the like, and a light emission signal and an exposure signal are generated by the processor executing driving program stored in the memory.

Diffusion plate 50 adjusts the intensity distribution and the angle of irradiation light. Moreover, in the adjustment of the intensity distribution, diffusion plate 50 makes the intensity distribution of irradiation light from light source 10 uniform. It should be noted that in the example shown in FIG. 1, depth acquisition device 1 includes diffusion plate 50; however, this diffusion plate 50 may not be included.

Lens 60 is an optical lens that collects light entering from the outside of depth acquisition device 1 on the surface of pixel array 2 of solid-state imaging element 20.

Band-pass filter 70 is an optical filter that transmits infrared light which is reflected light and visible light. It should be noted that in an example shown in FIG. 1, depth acquisition device 1 includes band-pass filter 70; however, this band-pass filter 70 may not be included.

Depth acquisition device 1 of the above-described configuration is used by being installed on a transport equipment. For example, depth acquisition device 1 is used by being installed on a vehicle that travels on the road surface. It should be noted that the transport equipment on which depth acquisition device 1 is installed does not need to be limited to a vehicle. Depth acquisition device 1 may be used by being installed on a transport equipment other than vehicles, such as motorcycles, boats, air planes, and the like.

[Functional Structure of Depth Acquisition Device]

Depth acquisition device 1 according to the present embodiment acquires an IR image and a BW image by the imaging of a substantially same scene, the imaging being performed at substantially the same viewpoint and time with the hardware structure shown in FIG. 1. Here, the IR image is formed based on the intensity of infrared light received by each of a plurality of first pixels 21 included in solid-state imaging element 20. Therefore, depth acquisition device 1 acquires the intensity of infrared light at each of the plurality of first pixels 21 by the imaging of an IR image. Based on the intensity of the infrared light of first pixel 21, depth acquisition device 1 acquires a depth image which indicates the distance to a subject projected on the IR image as a depth. Then, depth acquisition device 1 detects an edge region in the BW image and corrects the depth of the region in the depth image corresponding to the edge region.

It should be noted that in the present disclosure, a second region in a second image corresponding to the first region in the first image is a region in the second image which is located at the same position as that of the first region in the first image, and has the same shape and size as those of the first region. The first image and the second image are arbitrary images, respectively, and the first region and the second region are also arbitrary regions, respectively.

Further, an edge in the present disclosure is a boundary between two regions having mutually different luminances. The two regions are a light region and a dark region. The average luminance in the light region is higher than the average luminance in the dark region. Therefore, depth acquisition device 1 in the present disclosure detects, as the above-described edge region, a light-dark boundary region, which is a region including a boundary between a light region and a dark region in a visible light image such as a BW image.

Figure 4:
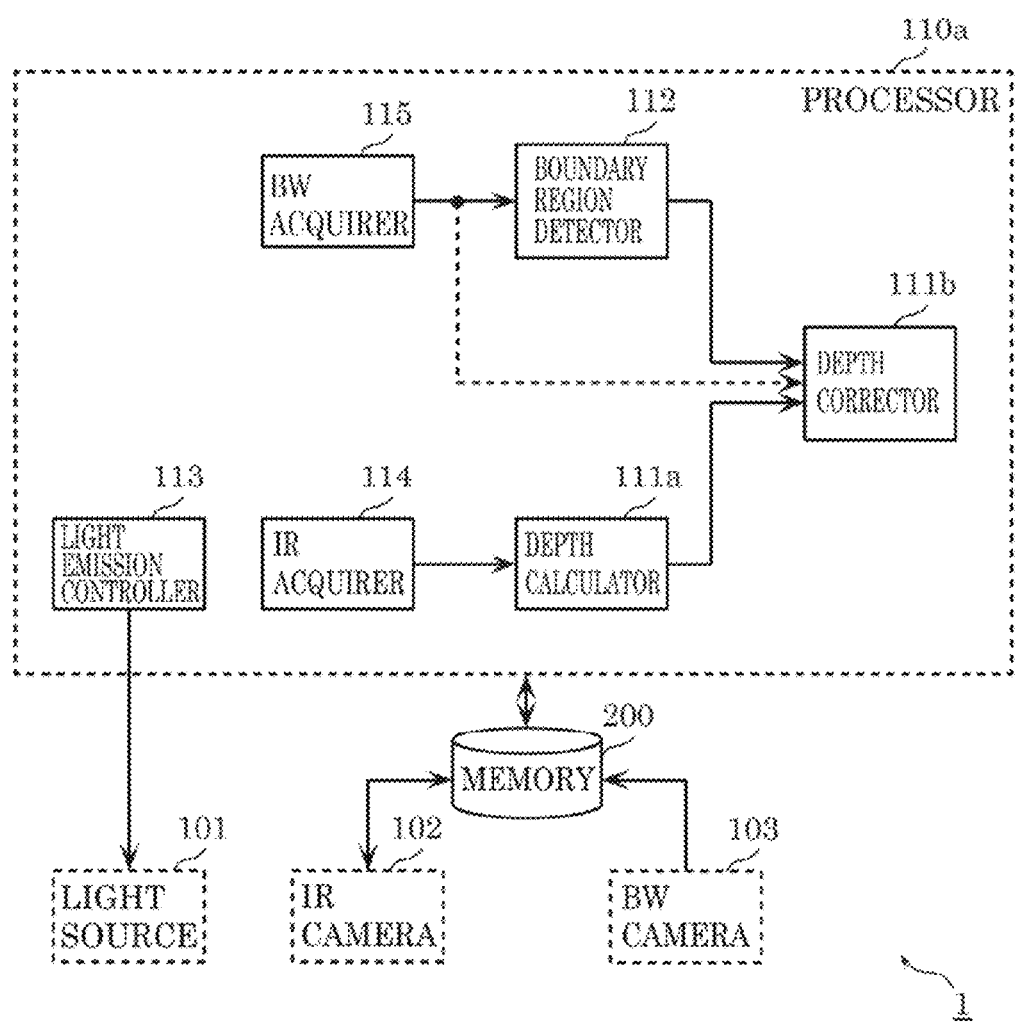
FIG. 4 is a block diagram illustrating an example of a functional structure of the depth acquisition device according to Embodiment.

FIG. 4 is a block diagram illustrating an example of a functional structure of depth acquisition device 1.

Depth acquisition device 1 includes light source 101, IR camera 102, BW camera 103, processor 110a, and memory 200. It should be noted that, although depth acquisition device 1 according to the present embodiment includes light source 101, IR camera 102, and BW camera 103, it may not include these components, and may include only processor 110a and memory 200.

Light source 101 may be constituted by light source 10 and diffusion plate 50 shown in FIG. 1, and emits light so as to irradiate a subject with infrared light.

IR camera 102 is also referred to as an infrared camera, and may be constituted by a plurality of first pixels 21 of solid-state imaging element 20, lens 60, and band-pass filter 70, which are shown in FIG. 1. Such IR camera 102 acquires an IR image by performing imaging of a scene including a subject with infrared light according to the timing when light source 101 irradiates the subject with infrared light. Further, IR camera 102 measures the intensity of infrared light by the imaging of an IR image. That is, IR camera 102 has solid-state imaging element 20, and measures the intensity of the infrared light by performing imaging in which infrared light emitted from light source 101 and reflected by the subject is received by each of the plurality of first pixels 21 included in solid-state imaging element 20.

BW camera 103, also referred to as a visible light camera, may be constituted by a plurality of second pixels 22 of solid-state imaging element 20, lens 60, and band-pass filter 70, which are shown in FIG. 1. Such BW camera 103 acquires a visible light image (specifically, a BW image) by the imaging of a substantially same scene as that of the IR image, with visible light, the imaging being performed at the same view point and the same time as those of the IR image. That is, BW camera 103 generates a BW image by imaging a substantially same scene as that of the IR image, with visible light, at substantially same viewpoint and time as those of the IR image, where the IR image is formed based on the intensity of infrared light received by each of the plurality of first pixels 21 included in solid-state imaging element 20.

Memory 200 is a recording medium for storing an IR image obtained by imaging with IR camera 102, and a BW image obtained by imaging with BW camera 103. It should be noted that as described above, the IR image is formed based on the intensity of infrared light received by each of the plurality of first pixels 21 included in solid-state imaging element 20. Therefore, the IR image indicates the intensity of infrared light for each pixel. That is, it can be said that memory 200 stores the intensity of infrared light. Specifically, such memory 200 may be a Read Only Memory (ROM), a Random Access Memory (RAM), a Solid State Drive (SSD), or the like and may be non-volatile or volatile. Further, memory 200 may be a hard disk.

Processor 110a acquires an IR image and a BW image from memory 200, calculates a depth image from the IR image, and detects a light-dark boundary region in the BW image based on the IR image and the BW image. Then, processor 110a corrects the depth of the region in the depth image corresponding to the light-dark boundary region.

It should be noted that the light-dark boundary region of the BW image is a region including a boundary between a light region and a dark region, the boundary being along a direction perpendicular to the direction of movement of the BW image. There is possibility that inappropriate depth is shown in the region in the depth image corresponding to the light-dark boundary region.

The reason is as follows. The luminance in the light-dark boundary region of the BW image changes significantly in a short period of time depending on the movement of the BW image. That is, in a short period of time, the object to be projected on the light-dark boundary region is replaced with another object whose reflectivity of light is significantly different from that of the object. Further, the movement of the BW image is caused by, for example, the movement of BW camera 103, and when IR camera 102 is moving together with BW camera 103, for example, when depth acquisition device 1 is mounted on the vehicle, the movement of the BW image is equal to the movement of the IR image. Therefore, the same phenomenon as that in the BW image occurs in the IR image. That is, the object to be projected on the region in the IR image corresponding to the light-dark boundary region is replaced, in a short period of time, with another object whose reflectivity of infrared light is significantly different from that of the object. Consequently, the depth measured by ToF using the intensity of infrared light corresponding to the light-dark boundary region becomes inaccurate. That is, the depth obtained by such measurement appears as noise in the depth image.

In this way, the region where noise appears in the depth image corresponds to the region including the above-described boundary in the BW image. Therefore, by detecting the region including such a boundary, that is, the light-dark boundary region, it is possible to appropriately find the region to be corrected in the depth image. Depth acquisition device 1 in the present embodiment corrects the depth of the region to be corrected in the depth image, that is, the target region to be corrected, which is the region corresponding to the light-dark boundary region.

Such processor 110a includes light emission controller 113, IR acquirer 114, BW acquirer 115, depth calculator 111a, boundary region detector 112, and depth corrector 111b.

Light emission controller 113 controls light source 101. That is, light emission controller 113 outputs the above-described light emission signal to light source 101, thereby causing light source 101 to emit light. As a result of this, infrared light is irradiated from light source 101 to the subject, and the reflected light, which is the light reflected by the subject, enters IR camera 102.

IR acquirer 114 acquires an IR image from IR camera 102 via memory 200. Here, each pixel of the IR image indicates the intensity of infrared light received at the position of the pixel as a pixel value (specifically, luminance). Therefore, IR acquirer 114 acquires the intensity of infrared light by acquiring the IR image. That is, IR acquirer 114 acquires the intensity of infrared light stored in memory 200, the intensity of infrared light being measured by imaging in which each of the plurality of first pixels included in solid-state imaging element 20 receives infrared light irradiated from light source 101 and reflected by the subject.

BW acquirer 115 acquires a BW image from BW camera 103 via memory 200. That is, BW acquirer 115 acquires a BW image stored in memory 200, the BW image being generated by imaging, with visible light, a substantially same scene as that of the IR image at substantially same viewpoint and time as those of the IR image, where the IR image is formed based on the intensity of infrared light received by each of the plurality of first pixels included in solid-state imaging element 20.

Depth calculator 111a generates a depth image by calculating the distance to the subject as the depth based on the intensity of the infrared light received by first pixel 21 for each of a plurality of first pixels 21 included in solid-state imaging element 20.

Boundary region detector 112 detects, from the BW image, a light-dark boundary region, which includes a boundary between a light region and a dark region, the boundary being along a direction perpendicular to the direction of movement of the BW image.

Depth corrector 111b corrects the depth of a target region to be corrected, which is a region in the depth image corresponding to the light-dark boundary region.

For example, when a boundary between two objects having mutually different reflectivities to infrared light is imaged, if IR camera 102 to be used for the imaging is moved, the reflectivity at the target position to be measured in the area around the boundary may change significantly during the measurement by ToF. In such a case, noise is generated at the target position to be measured, and a depth image indicating an inaccurate depth will be acquired.

However, in depth acquisition device 1 according to the present embodiment, as described above, a region including a boundary between a light region and a dark region, the boundary being along the direction perpendicular to the movement direction of the visible light image, is detected as a light-dark boundary region, from the BW image. This light-dark boundary region is a region on which the above-described area around the boundary, where the reflectivity of infrared light is likely to change significantly during the measurement by ToF, is projected. Then, the region in the depth image corresponding to the light-dark boundary region is designated as the target region to be corrected, and the depth of the target region to be corrected is corrected so that it is possible to reduce noise and accurately acquire the depth of the area around the boundary.

Therefore, such depth acquisition device 1 according to the present embodiment can accurately acquire the depth, which is the distance to the area around the boundary of those objects, even if the boundary between two objects having mutually different reflectivities to infrared light lies along a direction perpendicular to the direction of movement of the image.

[An Example of Each Image]

Figure 5:
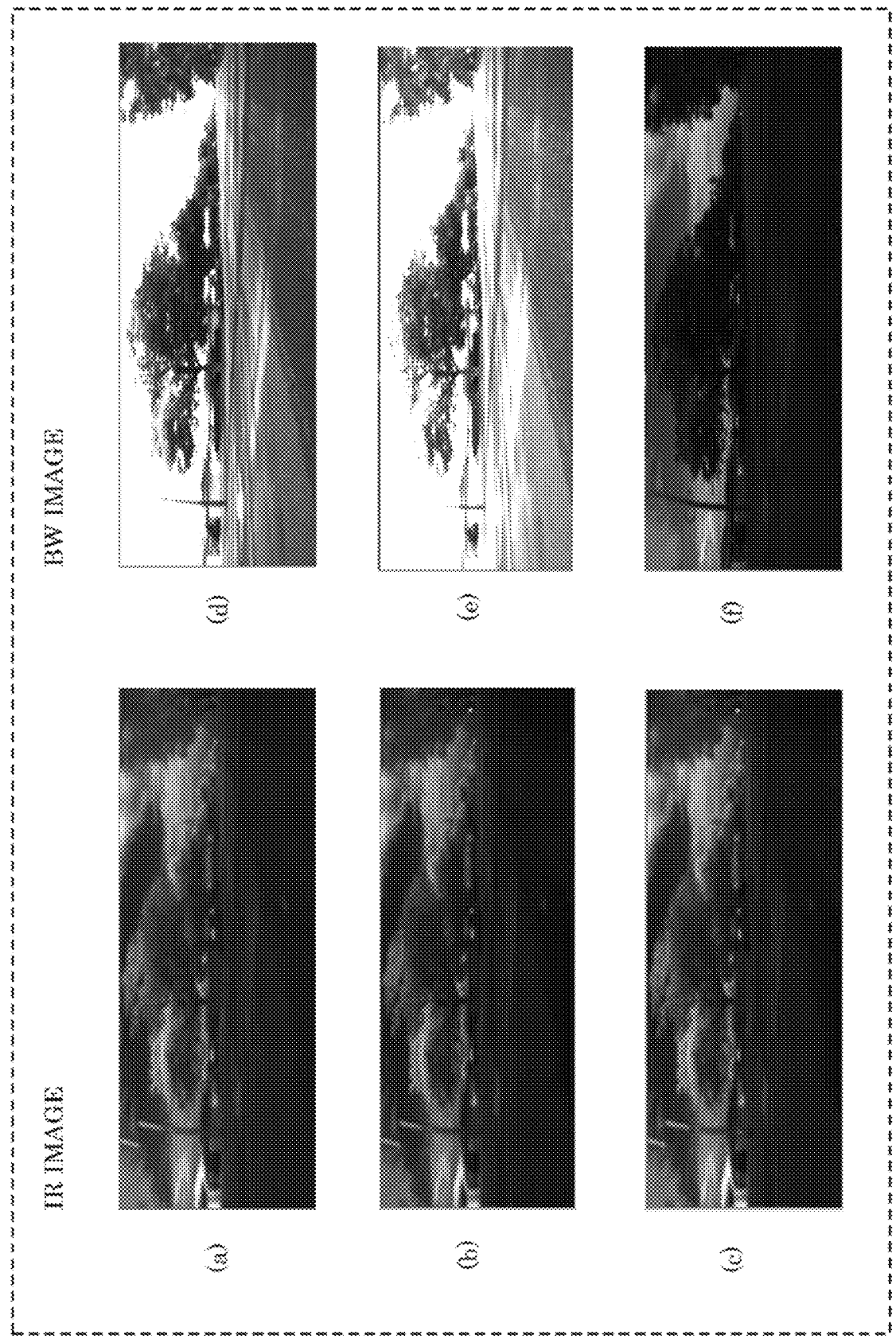
FIG. 5 is a diagram illustrating an example of a BW image and an IR image.

FIG. 5 shows an example of a BW image and an IR image.

For example, when the vehicle is traveling on the road surface, each of IR camera 102 and BW camera 103 of depth acquisition device 1 mounted on the vehicle performs imaging at substantially the same time. At this time, each of IR camera 102 and BW camera 103 performs exposure at three mutually different timings. As a result, three IR images are generated by imaging with IR camera 102, and three BW images are generated by imaging with BW camera 103.

On the IR image which is generated by the imaging with IR camera 102 and is acquired by IR acquirer 114, the road surface and trees in its periphery are projected as shown, for example, in (a) to (c) of FIG. 5.

Further, a scene that is substantially the same as that of the IR images shown in (a) to (c) of FIG. 5 is projected on the BW images generated by the imaging with BW camera 103 and acquired by BW acquirer 115 as shown in (d) to (f) of FIG. 5. Further, the BW images shown in (d) to (f) of FIG. 5 are obtained by imaging substantially at the same viewpoint and at the same time as those of the imaging of the IR images shown in (a) to (c) of FIG. 5. Therefore, in the IR images shown in (a) to (c) of FIG. 5 and the BW images shown in (d) to (f) of FIG. 5, the same object is projected on the regions corresponding to each other. It should be noted that the regions corresponding to each other are regions having the same position, size, and shape in each image.

Here, in the BW image, the luminance of the image of leaves of the tree is low, and the luminance of the image of the sky in the background is high. Therefore, a region including a boundary along a direction perpendicular to the direction of movement of the image, among boundaries between the leaf image and the sky image, corresponds to the light-dark boundary region. In such a region in the IR image corresponding to the light-dark boundary region, an inappropriate intensity of infrared light is obtained so that the image tends to be blurred. In addition, the reliability of the depth calculated by such inappropriate intensity of infrared light also tends to deteriorate. Depth corrector 111b according to the present embodiment enhances the reliability of depth by correcting the depth.

[Processing Flow]

Figure 6:
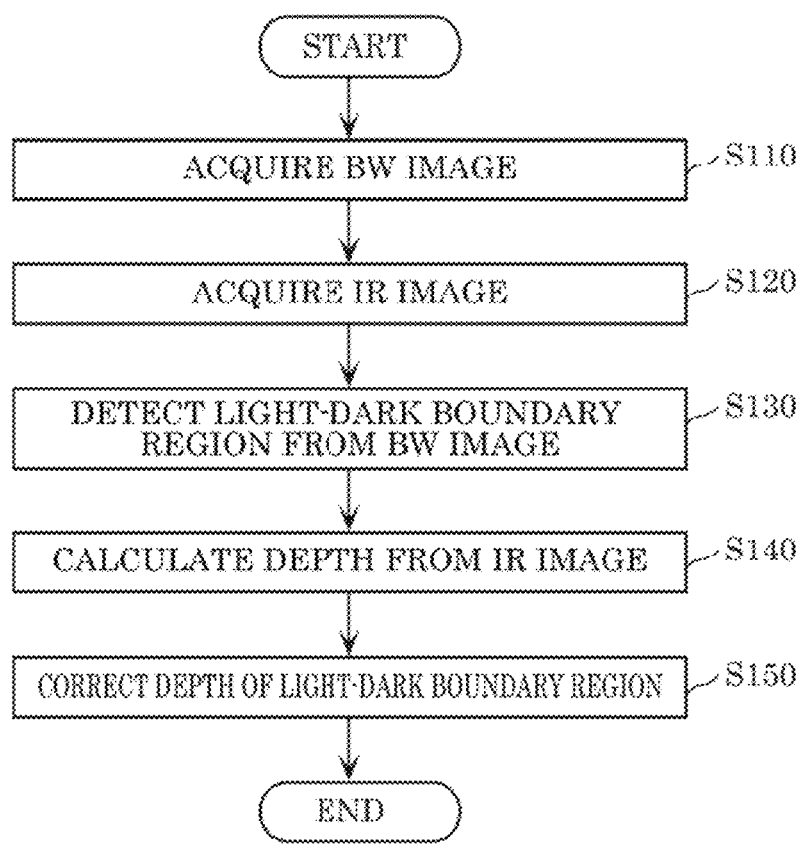
FIG. 6 is a flowchart illustrating overall processing operation of the depth acquisition device according to Embodiment.

FIG. 6 is a flowchart illustrating overall processing operation of depth acquisition device 1 according to the present embodiment.

(Step S110)

First, BW camera 103 generates a BW image by performing imaging with visible light. Then, BW acquirer 115 acquires the BW image via memory 200.

(Step S120)

Next, IR camera 102 performs imaging with infrared light to measure the intensity of the infrared light. Then IR acquirer 114 acquires the intensity of the infrared light via memory 200. Here, the intensity of the acquired infrared light is the intensity of the infrared light received by each of the plurality of first pixels 21 of solid-state imaging element 20. Therefore, IR acquirer 114 acquires the IR image to be formed based on the intensity of the infrared light by acquiring the intensity of the infrared light.

Specifically, the intensity of infrared light acquired from memory 200 consists of at least three intensities which are measured by the exposure of solid-state imaging element 20 at at least three timings different from each other when the infrared light irradiated from light source 101 and reflected by the subject is received by the solid-state imaging element 20. For example, as shown in FIG. 3, the intensity of infrared light consists of three intensities measured by a first exposure period, a second exposure period, and a third exposure period. For example, each pixel value included in one frame of IR image is indicated as a cumulative value of the intensities of the infrared light measured by exposure at at least three timings.

(Step S130)

Next, boundary region detector 112 detects a light-dark boundary region from the BW image acquired in step S110. Then, boundary region detector 112 outputs a binary mask image which indicates 1 for each pixel in the detected light-dark boundary region and 0 for each pixel in the other regions.

(Step S140)

Next, depth calculator 111a calculates a depth based on the intensity of the infrared light acquired in step S120. That is, depth calculator 111a generates a depth image by calculating the distance to a subject as a depth based on the intensity of the infrared light received by first pixel 21 for each of the plurality of first pixels 21 included in solid-state imaging element 20. Specifically, depth calculator 111a generates a depth image by calculating the depth of each of the plurality of first pixels 21 included in solid-state imaging element 20 based on the above-described at least three intensities measured by first pixel 21. For example, depth calculator 111a calculates a depth using the above-described (Equation 1) according to the ToF distance measurement method.

(Step S150)

Next, depth corrector 111b corrects the depth of a region in the depth image corresponding to a light-dark boundary region, that is, a target region to be corrected.

Specifically, depth corrector 111b acquires a BW image, a depth image, and a mask image, and corrects the depth (that is, a pixel value in the depth image) in a region of the depth image indicated as 1 by the mask image. This depth correction is performed by, for example, an extended filter of Guided Filter which uses a BW image as a guide image. This extended filter is disclosed in Non Patent Literature (Jiangbo Lu, Keyang Shi, Dongbo Min, Liang Lin, and Minh N. Do, "Cross-Based Local Multipoint Filtering", 2012 IEEE Conference on Computer Vision and Pattern Recognition). Alternatively, the depth correction can be implemented by the method disclosed in Non Patent Literature (Dongbo Min, Sunghwan Choi, Jiangbo Lu, Bumsub Ham, Kwanghoon Sohn, and Minh N. Do, "Fast Global Image Smoothing Based on Weighted Least Squares", IEEE Transactions on Image Processing, Vol. 23, No. 12, December 2014).

In this way, depth corrector 111b according to the present embodiment corrects the depth of a target region to be corrected through filtering on a depth image by using a BW image as a guide image or a reference image. This makes it possible to properly correct the depth of a target region to be corrected.

It should be noted that depth correction is not limited to the one described above, and for example, interpolation may be applied to emphasize the depth in the region in contact with the lower part of a light-dark boundary region. That is, depth corrector 111b may correct the depth of a target region to be corrected by using the depth of a peripheral region which is a region located in the periphery of the target region to be corrected in the depth image. Further, the peripheral region may be a region in contact with the lower side of the target region to be corrected. In this case, depth corrector 111b may replace the depth of the target region to be corrected with the depth of the peripheral region. It is highly likely that the depth of the peripheral region is close to the correct depth of the target region to be corrected. Therefore, by using the depth of such a peripheral region, it is possible to properly correct the depth of the target region to be corrected.

Further, in addition to the BW image, the depth image, and the mask image, an IR image may be used as an input. For example, depth corrector 111b may correct the depth of a target region to be corrected in the depth image by inputting an IR image, a BW image, a depth image, and a light-dark boundary region to a learning model. It should be noted that the above-described mask image may be used instead of the light-dark boundary region. For example, the learning model is a neural network constructed by deep learning. In the training of this learning model, an IR image, a BW image, a depth image, and a light-dark boundary region are given to the learning model as inputs. Then, the learning model is trained such that the output from the learning model for the inputs agrees with the correct depth image after correction. By using such trained learning model, depth corrector 111b can easily acquire a depth image after correction.

Figure 7:
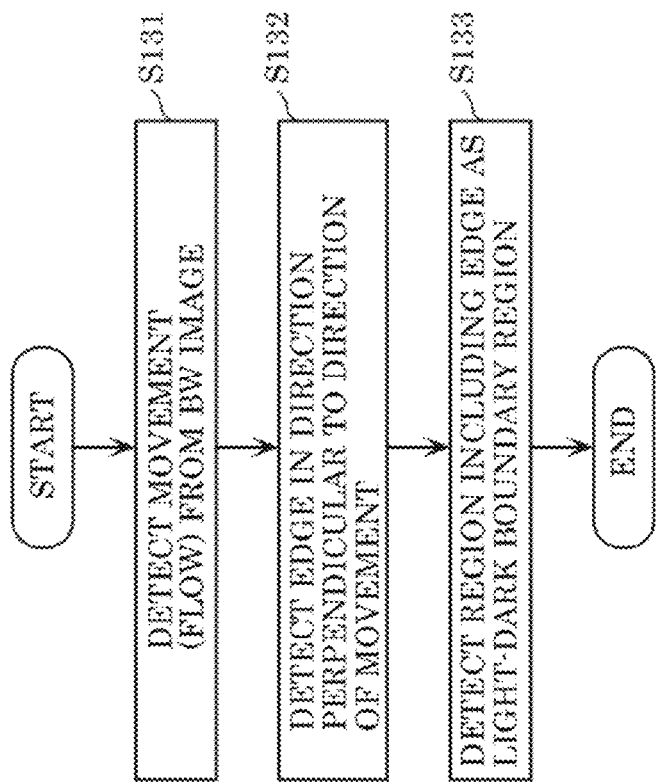
FIG. 7 is a flowchart illustrating an example of processing operation of a boundary region detector according to Embodiment.

FIG. 7 is a flowchart illustrating an example of processing operation of boundary region detector 112. It should be noted that FIG. 7 shows in detail the processing of step S130 of FIG. 6.

(Step S131)

First, boundary region detector 112 detects movement from a BW image. This movement is detected, for example, by movement search that performs block matching between the BW image and a past BW image.

(Step S132)

Next, boundary region detector 112 detects an edge along a direction perpendicular to the direction of movement detected in step S131 from the BW image as the above-described boundary. At this time, boundary region detector 112 may detect an edge having an intensity not less than a first threshold.

(Step S133)

Boundary region detector 112 detects the region including the edge detected in step S132 as the light-dark boundary region. At this time, boundary region detector 112 extracts, for example, a region at a certain distance from this edge as a light-dark boundary region. Specifically, the light-dark boundary region is a region from an edge having an intensity not less than the first threshold to a distance according to the movement of the BW image.

Here, the above-described distance is equal to the length of the movement vector indicating the movement of the BW image, or the length obtained by multiplying the length of the movement vector by a constant (for example, 1.1 times the length of the movement vector). Alternatively, the distance may be the length of the movement vector plus a constant (for example, the length of the movement vector+3 pixels, or +5 pixels). Further, the direction of the movement vector may be taken into consideration for the distance. For example, the distance from the edge in the direction of the movement vector may be not less than the length of the movement vector, and the distance in the direction opposite to the movement vector may be, for example, 0.1 times the length of the movement vector, or may be a constant such as 3 pixels or 5 pixels.

As described above, boundary region detector 112 according to the present embodiment detects, from the BW image, an edge along a direction perpendicular to the direction of movement in the BW image as the boundary, and detects the region including the edge as the light-dark boundary region. Specifically, boundary region detector 112 detects an edge having an intensity not less than the first threshold. The region including the edge is a region from the edge having the intensity not less than the first threshold to a distance according to the movement of the BW image. This makes it possible to appropriately detect the light-dark boundary region. Consequently, it is possible to appropriately detect a region where noise is likely to occur in a depth image.

Figure 8:
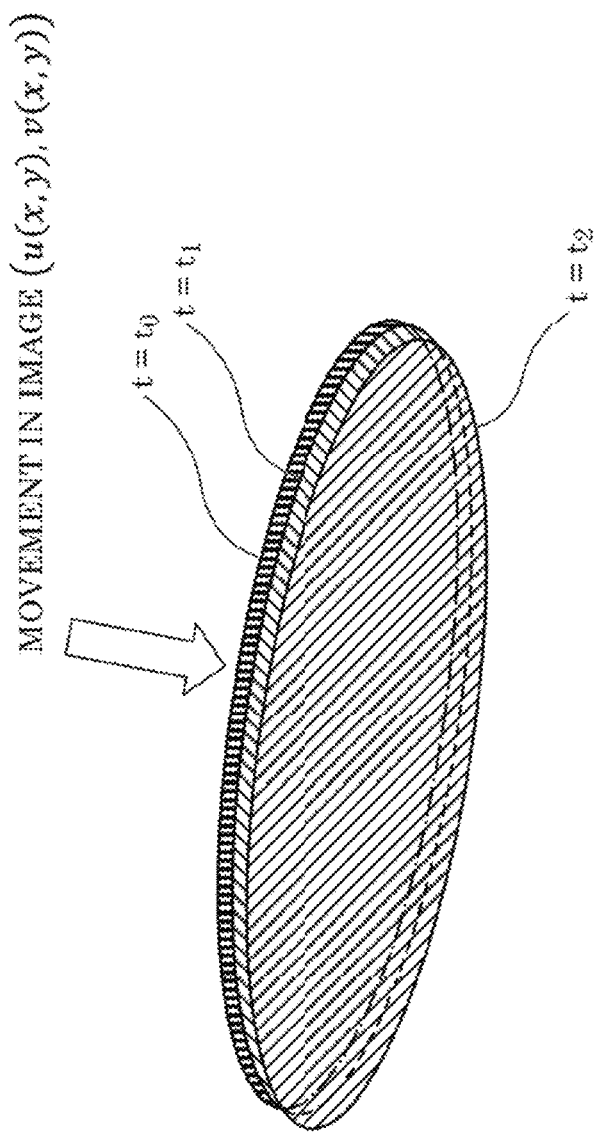
FIG. 8 is a diagram for explaining edge detection according to Embodiment.

FIG. 8 is a diagram for explaining the edge detection of step S132 in FIG. 7.

For example, an object projected on a BW image moves with the passage of time, like times t0, t1 and t2 shown in FIG. 8. Such movement of an object occurs, for example, when a vehicle equipped with depth acquisition device 1 moves. Such movement at a pixel (x, y) in a BW image is represented as a movement vector (u (x, y), v (x, y)).

Boundary region detector 112 calculates the intensity of edge as the amount of change in the pixel value by differentiating the distribution in a spatial direction of the pixel value. The differential with respect to arbitrary direction n is expressed by (Equation 2).

$$\frac{\partial I(x, y)}{\partial n} = \cos\theta \frac{\partial I(x, y)}{\partial x} + \sin\theta \frac{\partial I(x, y)}{\partial y} \qquad \text{(Equation 2)}$$

Here, the direction n is considered as the direction of the movement vector (u (x, y), v (x, y)) of the image, that is, a unit vector which is in the same orientation as and in the parallel direction with the movement vector. That is, the x-component cos θ and the y-component sin θ of n are represented by (Equation 3). The movement vector of the image is obtained by a known method.

$$\cos\theta = \frac{u(x, y)}{\sqrt{u(x, y)^2 + v(x, y)^2}} \qquad \text{(Equation 3)}$$

$$\sin\theta = \frac{v(x, y)}{\sqrt{u(x, y)^2 + v(x, y)^2}}$$

Further, the luminance gradients in the horizontal direction and the vertical direction in (Equation 2) are calculated by (Equation 4) and (Equation 5), respectively.

$$\frac{\partial I(x, y)}{\partial x} = \frac{I(x+1, y) - I(x-1, y)}{2} \qquad \text{(Equation 4)}$$

$$\frac{\partial I(x, y)}{\partial y} = \frac{I(x, y+1) - I(x, y-1)}{2} \qquad \text{(Equation 5)}$$

It should be noted that the calculation of the luminance gradients in the horizontal direction and the vertical direction is not limited to the calculation based on a two-sided difference shown in (Equation 4) and (Equation 5). Instead, calculation based on a forward difference shown in (Equation 6) and (Equation 7), or a method based on a backward difference shown in (Equation 8) and (Equation 9) may be used. Similar results can be obtained with any of these calculations.

$$\frac{\partial I(x, y)}{\partial x} = I(x+1, y) - I(x, y) \qquad \text{(Equation 6)}$$

-continued $$\frac{\partial I(x, y)}{\partial y} = I(x, y+1) - I(x, y) \quad \text{(Equation 7)}$$

$$\frac{\partial I(x, y)}{\partial x} = I(x, y) - I(x-1, y) \quad \text{(Equation 8)}$$

$$\frac{\partial I(x, y)}{\partial y} = I(x, y) - I(x, y-1) \quad \text{(Equation 9)}$$

It should be noted that in (Equation 4) to (Equation 9), the calculation is performed only between the pixels in the same row or the same column, but this is not limiting. Instead, by performing calculations using pixel values of adjacent rows or columns as shown in (Equation 10) to (Equation 15), it is possible to calculate a stable luminance gradient with reduced effects of noise.

$$\frac{\partial I(x, y)}{\partial x} = \frac{(I(x+1, y-1) + I(x+1, y) + I(x+1, y+1)) - (I(x-1, y-1) + I(x-1, y) + I(x-1, y+1))}{6} \quad \text{(Equation 10)}$$

$$\frac{\partial I(x, y)}{\partial y} = \frac{(I(x-1, y+1) + I(x, y+1) + I(x+1, y+1)) - (I(x-1, y-1) + I(x, y-1) + I(x+1, y-1))}{6} \quad \text{(Equation 11)}$$

$$\frac{\partial I(x, y)}{\partial x} = \frac{(I(x+1, y-1) + I(x+1, y) + I(x+1, y+1)) - (I(x, y-1) + I(x, y) + I(x, y+1))}{3} \quad \text{(Equation 12)}$$

$$\frac{\partial I(x, y)}{\partial y} = \frac{(I(x-1, y+1) + I(x, y+1) + I(x+1, y+1)) - (I(x-1, y) + I(x, y) + I(x+1, y))}{3} \quad \text{(Equation 13)}$$

$$\frac{\partial I(x, y)}{\partial x} = \frac{(I(x, y-1) + I(x, y) + I(x, y+1)) - (I(x-1, y-1) + I(x-1, y) + I(x-1, y+1))}{3} \quad \text{(Equation 14)}$$

$$\frac{\partial I(x, y)}{\partial y} = \frac{(I(x-1, y) + I(x, y) + I(x+1, y)) - (I(x-1, y-1) + I(x, y-1) + I(x+1, y-1))}{3} \quad \text{(Equation 15)}$$

Further, when calculating the luminance gradient using the pixel values of a plurality of rows or a plurality of columns, the weight of the row of interest or the column of interest may be increased in comparison with that of the adjacent row or column as shown in (Equation 16) to (Equation 21).

$$\frac{\partial I(x, y)}{\partial x} = \frac{(I(x+1, y-1) + 2I(x+1, y) + I(x+1, y+1)) - (I(x-1, y-1) + 2I(x-1, y) + I(x-1, y+1))}{8} \quad \text{(Equation 16)}$$

$$\frac{\partial I(x, y)}{\partial y} = \frac{(I(x-1, y+1) + 2I(x, y+1) + I(x+1, y+1)) - (I(x-1, y-1) + 2I(x, y-1) + I(x+1, y-1))}{8} \quad \text{(Equation 17)}$$

$$\frac{\partial I(x, y)}{\partial x} = \frac{(I(x+1, y-1) + 2I(x+1, y) + I(x+1, y+1)) - (I(x, y-1) + 2I(x, y) + I(x, y+1))}{4} \quad \text{(Equation 18)}$$

$$\frac{\partial I(x, y)}{\partial y} = \frac{(I(x-1, y+1) + 2I(x, y+1) + I(x+1, y+1)) - (I(x-1, y) + 2I(x, y) + I(x+1, y))}{4} \quad \text{(Equation 19)}$$

$$\frac{\partial I(x, y)}{\partial x} = \frac{(I(x, y-1) + 2I(x, y) + I(x, y+1)) - (I(x-1, y-1) + 2I(x-1, y) + I(x-1, y+1))}{4} \quad \text{(Equation 20)}$$

$$\frac{\partial I(x, y)}{\partial y} = \frac{(I(x-1, y) + 2I(x, y) + I(x+1, y)) - (I(x-1, y-1) + 2I(x, y-1) + I(x+1, y-1))}{4} \quad \text{(Equation 21)}$$

Using the horizontal luminance gradient and the vertical luminance gradient shown in (Equation 4) to (Equation 21) and the horizontal component cos θ and the vertical component sin θ of the direction vector n of movement shown in (Equation 3), boundary region detector 112 calculates the directional derivative ∂I(x, y)/∂n along the direction n of movement as the intensity of edge according to (Equation 2).

It should be noted that boundary region detector 112 may calculate the directional derivative by not only the method of (Equation 2) but also another method. For example, boundary region detector 112 calculates by interpolation the pixel value of at least one pixel on a straight line determined by a point of interest and a differential direction. Then, boundary region detector 112 calculates the directional derivative from a difference value of any two pixel values out of the calculated pixel value of at least one pixel and the pixel value of the point of interest. Even with such a method, the same result as that of the above-described method of (Equation 2) can be obtained.

Boundary region detector 112 detects, as an edge, a pixel whose absolute value of the directional derivative is not less than the first threshold.

Figure 9:
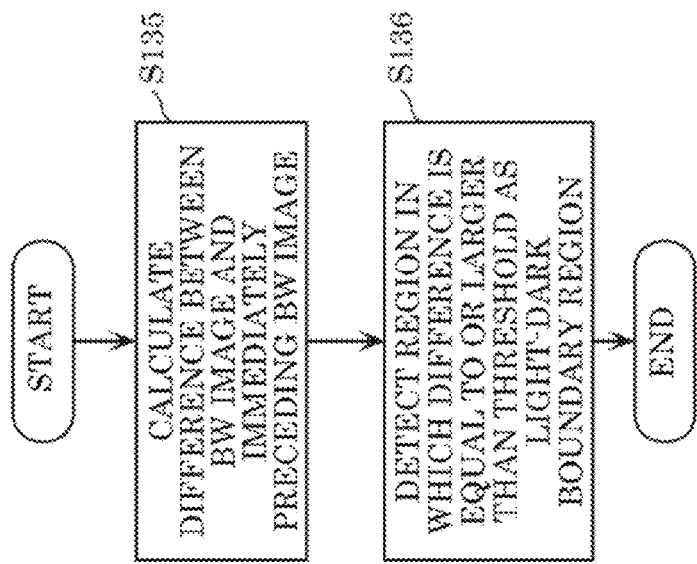
FIG. 9 is a flowchart illustrating another example of processing operation of the boundary region detector according to Embodiment.

FIG. 9 is a flowchart illustrating another example of processing operation of boundary region detector 112. FIG. 9 illustrates the processing of step S130 of FIG. 6 in detail.
(Step S135)

Boundary region detector 112 calculates a difference between a BW image and the immediately preceding BW image.
(Step S136)

Then, boundary region detector 112 detects, as a light-dark boundary region, a region whose difference is not less than a second threshold in a BW image.

In this way, boundary region detector 112 according to the present embodiment detects a region in which the difference between the pixel values of the BW image and the past BW image is not less than the second threshold as the light-dark boundary region. As a result of this, the light-dark boundary region can be easily detected.
(Variation)

Although a light-dark boundary region is detected to correct the depth in the above-described embodiment, the depth may be corrected by using a learning model without detecting the light-dark boundary region.

Figure 10:
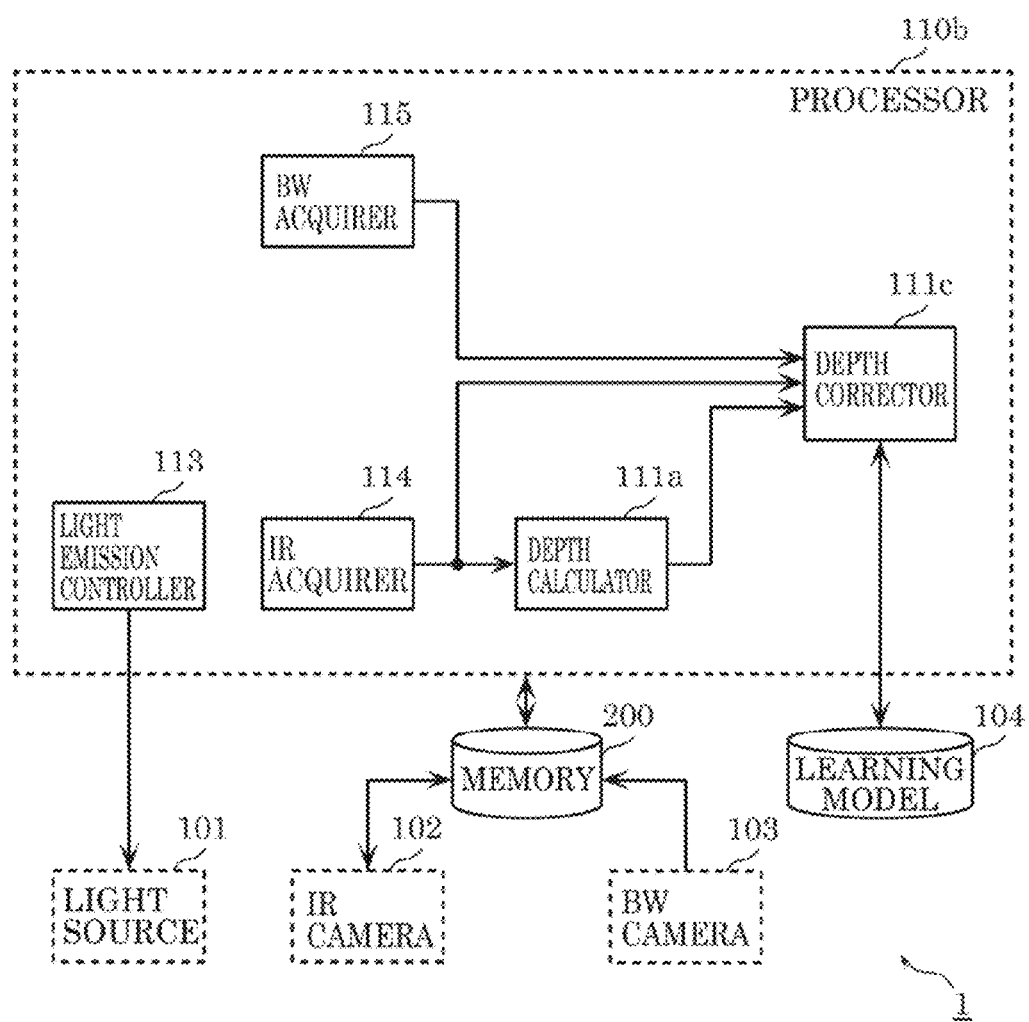
FIG. 10 is a block diagram illustrating an example of a functional structure of a depth acquisition device according to a variation of Embodiment.

FIG. 10 is a block diagram illustrating an example of a functional structure of depth acquisition device 1 according to the present variation. It should be noted that the same components as those shown in FIG. 4 are given the same reference marks as those shown in FIG. 4, and detailed description thereof will be omitted.

Depth acquisition device 1 according to the present variation includes processor 110b instead of processor 110a shown in FIG. 4, and further includes learning model 104.

Learning model 104 is, for example, a neural network and is configured by deep learning. For example, a BW image, an IR image, and a depth image are used as the input data to be inputted to learning model 104. In this learning model 104, training has already been performed such that a correct depth image after correction will be outputted for the combination of the input data.

Processor 110b does not include boundary region detector 112 shown in FIG. 4, but includes depth corrector 111c instead of depth corrector 111b shown in FIG. 4.

Depth corrector 111c inputs the above-described input data to learning model 104 described above. Consequently, depth corrector 111c acquires a depth image after correction from learning model 104 as output data for the input data.

That is, depth acquisition device 1 shown in FIG. 10 includes memory 200 and processor 110b. Processor 110b acquires the intensity of infrared light stored in memory 200, the intensity of infrared light being measured by the imaging in which infrared light emitted from light source 101 and reflected by the subject is received by each of the plurality of first pixels 21 included in solid-state imaging element 20. Further, processor 110b generates a depth image by calculating the distance to a subject as the depth of each of the plurality of first pixels 21 included in solid-state imaging element 20 based on the intensity of the infrared light received by first pixel 21. Further, processor 110b acquires a BW image stored in memory 200, the BW image being generated by imaging, with visible light, a substantially same scene as that of the IR image at substantially same viewpoint and time as those of the IR image, where the IR image is formed based on the intensity of infrared light received by each of the plurality of first pixels 21 included in solid-state imaging element 20. Then, processor 110b corrects the depth of a depth image by inputting a depth image, an IR image, and a BW image into learning model 104.

In this way, if learning model 104 is trained in advance such that correct depth image after correction is to be outputted for the inputs of a depth image, an IR image, and a BW image, it is possible to appropriately correct the depth of a depth image without detecting a light-dark boundary region.

Figure 11A:
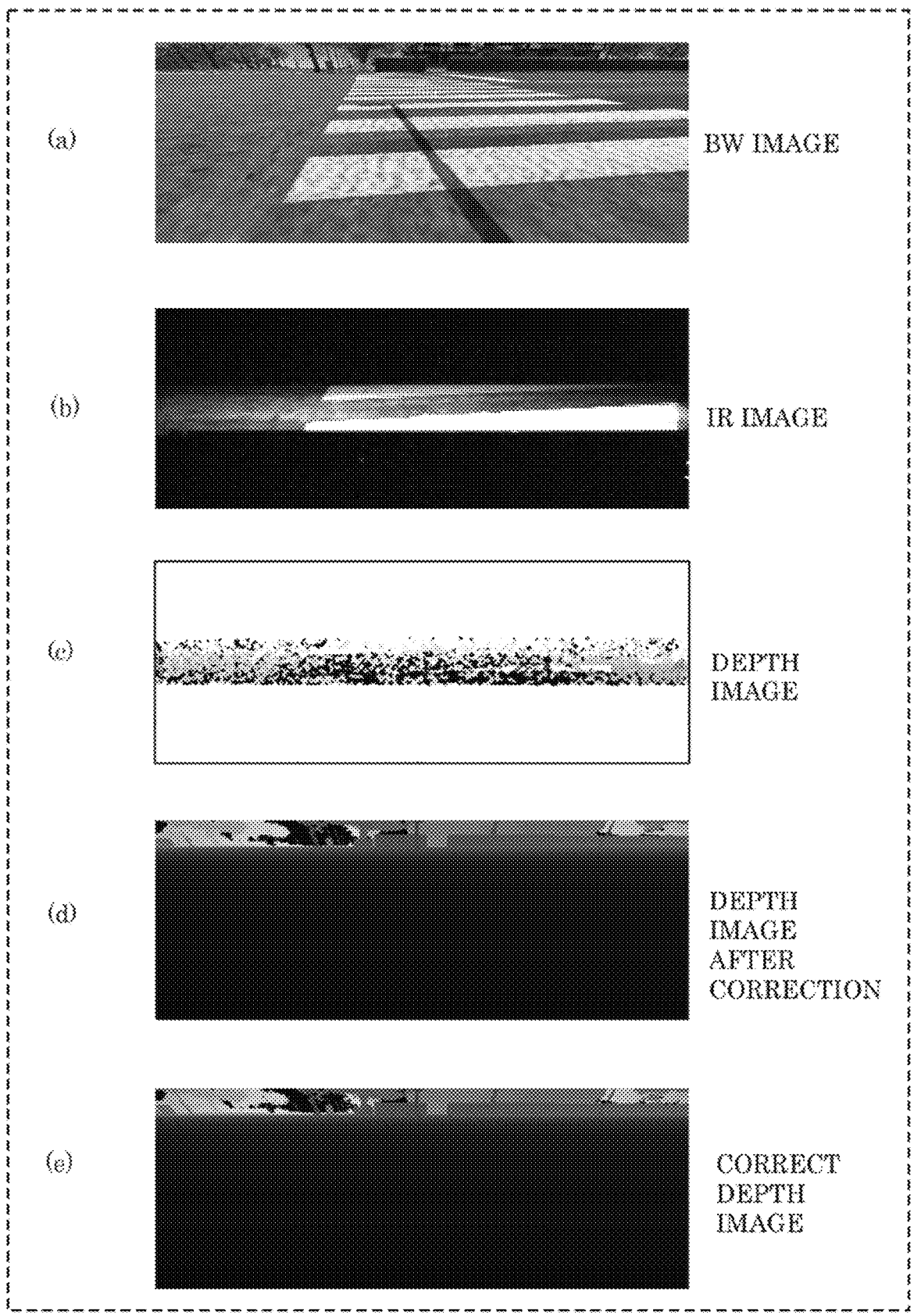
FIG. 11A is a diagram illustrating an example of simulation results of the depth acquisition device according to Embodiment.

FIG. 11A shows an example of simulation results of depth acquisition device 1 according to the present variation.

Depth acquisition device 1 acquires a BW image shown in (a) of FIG. 11A by imaging with BW camera 103, and further acquires an IR image shown in (b) of FIG. 11A by imaging with IR camera 102. The BW image and the IR image are images obtained by imaging the same scene at the same viewpoint and at the same time.

Depth calculator 111a generates the depth image shown in (c) of FIG. 11A based on the intensity of the infrared light forming the IR image. On the light-dark boundary region in the BW image shown in (a) of FIG. 11A, the outline of an object, for example, the outline of the white line of a pedestrian crossing drawn on the road surface is clearly projected. However, in the depth image shown in (c) of FIG. 11A, the depth of the region corresponding to the light-dark boundary region is expressed in an unclear manner.

Depth corrector 111b inputs a BW image, an IR image, and a depth image shown in (a) to (c) in FIG. 11A to learning model 104, and thereby acquires a depth image after correction shown in (d) of FIG. 11A from that learning model 104.

Consequently, depth acquisition device 1 according to the present variation makes it possible to bring the depth image after correction closer to the correct depth image shown in (e) of FIG. 11A.

Figure 11B:
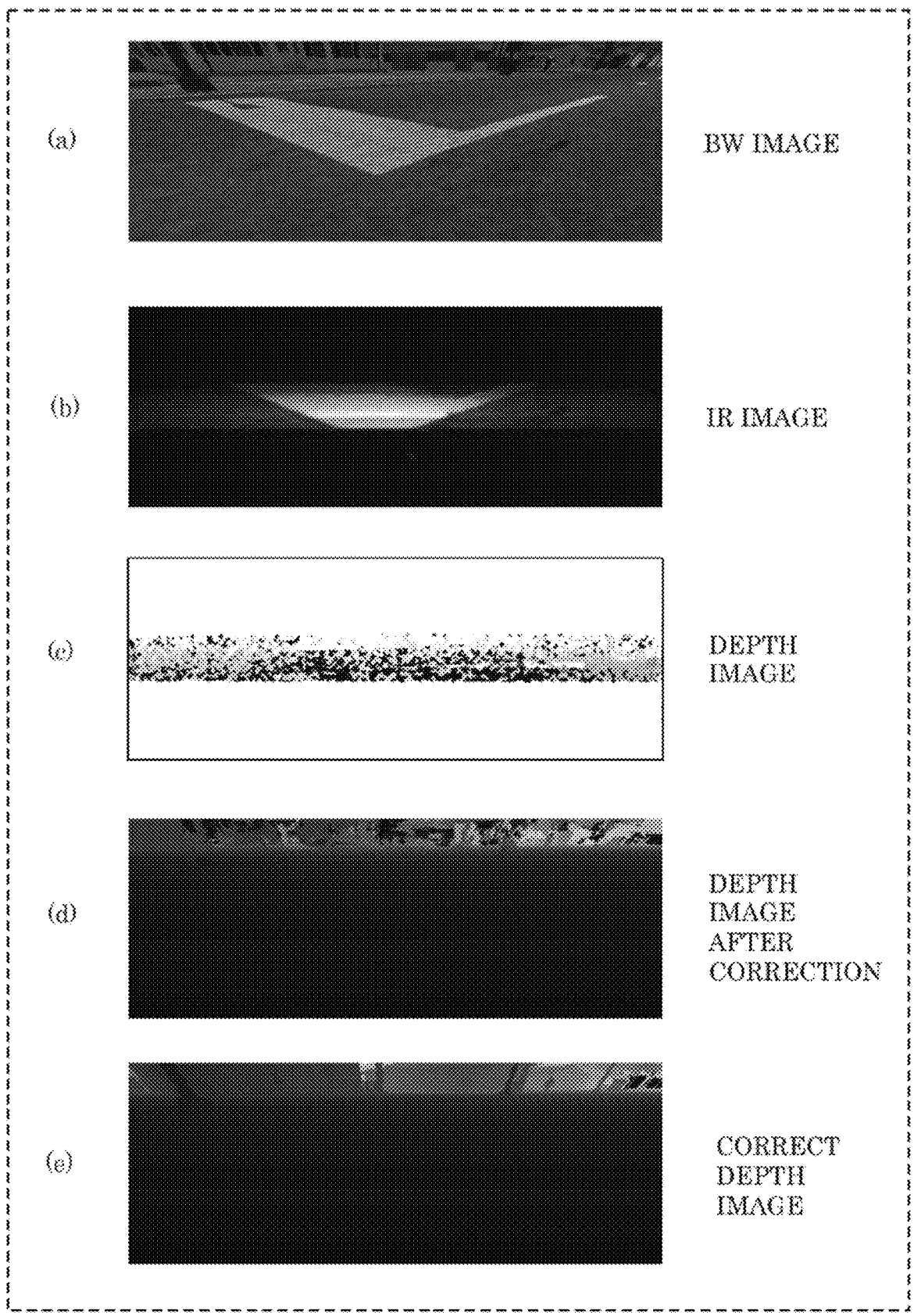
FIG. 11B is a diagram illustrating another example of simulation results of the depth acquisition device according to Embodiment.

FIG. 11B shows another example of simulation results of depth acquisition device 1 according to the present variation.

Depth acquisition device 1 acquires the BW image shown in (a) of FIG. 11B by imaging with BW camera 103, and further acquires the IR image shown in (b) of FIG. 11B by imaging with IR camera 102. In the example shown in FIG. 11B, as in the example shown in FIG. 11A, the BW image and the IR image are images obtained by imaging the same scene at the same viewpoint and at the same time.

Depth calculator 111a generates the depth image shown in (c) of FIG. 11B based on the intensity of the infrared light forming the IR image. On the light-dark boundary region in the BW image shown in (a) of FIG. 11B, the outline of an object, for example, the outline of the white line of a pedestrian crossing drawn on the road surface is clearly projected. However, in the depth image shown in (c) of FIG. 11B, the depth of the region corresponding to the light-dark boundary region is expressed in an unclear manner.

Depth corrector 111b inputs a BW image, an IR image, and a depth image shown in (a) to (c) in FIG. 11B to learning model 104, and thereby acquires the depth image after correction shown in (d) of FIG. 11B from learning model 104.

Consequently, depth acquisition device 1 according to the present variation makes it possible to bring the depth image after correction closer to the correct depth image shown in (e) of FIG. 11B.

As so far described, in depth acquisition device 1 according to the present embodiment and its variations, even when the boundary between two objects having mutually different reflectivities to infrared light is imaged, it is possible to accurately acquire the depth of the area around the boundary.

It should be noted that each of the elements in the above-described embodiment may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory. The software program for realizing the depth acquisition device according to any of the above-described embodiment and its variations causes a computer to execute the steps in a corresponding one of the flowcharts in FIGS. 6, 7, and 9.

Although the depth acquisition devices according to one or more aspects of the present disclosure have been described based on the embodiment and its variations, the present disclosure is not limited to them. Those skilled in the art will readily appreciate that an embodiment arrived at by making various modifications to the above embodiment and variations or an embodiment arrived at by selectively combining elements disclosed in the above embodiment and variations without materially departing from the scope of the present disclosure may be included within one or more aspects of the present disclosure.

For example, depth calculator 111a calculates a depth based on intensities of three infrared lights measured at three different exposure timings. However, each of the number of the exposure timings and the number of the intensities of three infrared lights is not limited to three and may be four or more.

Furthermore, although depth acquisition device 1 includes learning model 104 according to the variation of the embodiment, depth acquisition device 1 may not include learning model 104. In this case, depth acquisition device 1 may, for example, provide the above-described input data to learning model 104 via a communication network, and acquire, via the communication network, corrected depth image which is output data of learning model 104.

It should also be noted that all or a part of the units and the devices according to the present disclosure or all or a part of the functional blocks in the block diagrams of FIGS. 1, 4, and 10 may be implemented into one or more electronic circuits including a semiconductor device, a semiconductor Integrated Circuit (IC), or a Large Scale Integration (LSI). The LSI or the IC may be integrated into a single chip, or may be a combination of multiple chips. For example, the functional blocks except the storage element may be integrated into a single chip. Here, the LSI or the IC may be referred differently depending on the degree of integration, and may also be referred to as a system LSI, a Very Large Scale Integration (VLSI), or an Ultra Large Scale Integration (ULSI). A Field Programmable Gate Array (FPGA) which is programmable after manufacturing an LSI or a reconfigurable logic device capable of reconfiguring the connections or circuit segmentation in the LSI circuit may be used for the same purpose.

Furthermore, functions or operations of all or a part of the units, the devices, or a part of the devices may be realized by executing a software program. In this case, the software program is recorded on one or more nontransitory recording mediums such as a Read Only Memory (ROM), an optical disk, or a hard disk drive. When the software program is executed by a processor, the software program causes the processor and its peripheral devices to execute specific functions in the software program. The system or the device may include such one or more non-transitory recording medium on which the software program is recorded, a processor, and necessary hardware devices such as an interface.

INDUSTRIAL APPLICABILITY

The present disclosure is applicable to depth acquisition devices that acquire a depth to a subject of image, for example, applicable to in-vehicle devices and the like.

What is claimed is:

1. An imaging device, comprising:
a light source configured to irradiate irradiation light to a subject;
a solid-state imaging element configured to perform, on the subject, first imaging and second imaging, the second imaging being performed with reflected light, which is the irradiation light reflected by the subject; and
a hardware processor configured to execute a program in order to:
detect a light-dark boundary region by using subject information relating to the subject and outputted by the solid-state imaging element; and
generate output information according to the light-dark boundary region detected, and output the output information,
wherein in the detecting of the light-dark boundary region,
the hardware processor is configured to extract, from a visible light image indicated in the subject information, only a boundary lying along a direction perpendicular to a direction of movement of the visible light image among boundaries between two regions having mutually different luminances, to detect the light-dark boundary region which is a region including the boundary extracted.

2. The imaging device according to claim 1, wherein the irradiation light is infrared light.

3. The imaging device according to claim 2, wherein the solid-state imaging element:
acquires a visible light image by the first imaging on the subject; and
acquires an infrared image by the second imaging based on the infrared light.

4. The imaging device according to claim 3, wherein the hardware processor is further configured to generate a depth image, by calculating a distance to the subject as a depth, based on-the infrared image,
in the detecting of the light-dark boundary region, the hardware processor is configured to:
acquire, as the subject information, the visible light image generated by first imaging on a substantially same scene as a scene of the infrared light image, with visible light from a substantially same viewpoint as a viewpoint of imaging the infrared image at a substantially same timing as a timing of imaging the infrared image;
detect a light-dark boundary region from the visible light image, the light-dark boundary region being a region including an edge along a direction perpendicular to a direction of movement of the visible light image; and
in the generating and the outputting of the output information,
the hardware processor is configured to correct a depth of a target region to be corrected in the depth image and output the depth image corrected as the output information, the target region corresponding to the light-dark boundary region.

5. The imaging device according to claim 4, wherein
in the detecting of the light-dark boundary region,
the hardware processor is configured to detect an edge having an intensity not less than a first threshold among the intensities, and
the light-dark boundary region is a region within a distance corresponding to the movement of the visible light image from the edge having the intensity not less than the first threshold.

6. The imaging device according to claim 4, wherein
in the detecting of the light-dark boundary region,
the hardware processor is configured to detect, as the light-dark boundary region, a region having a difference not less than a second threshold between a pixel value of the visible light image and a pixel value of a visible light image previously generated.

7. An imaging method, comprising:
irradiating irradiation light to a subject;
performing, by the solid-state imaging element, on the subject, first imaging and second imaging, the second imaging being performed with reflected light, which is the irradiation light reflected by the subject;
detecting a light-dark boundary region by using subject information relating to the subject outputted by the first imaging and the second imaging; and
generating output information according to the light-dark boundary region detected, and outputting the output information, wherein
the detecting of the light-dark boundary region comprises extracting, from a visible light image indicated in the subject information, only a boundary lying along a direction perpendicular to a direction of movement of the visible light image among boundaries between two regions having mutually different luminances, to detect the light-dark boundary region which is a region including the boundary extracted.

8. An information processing device, comprising:
a memory configured to store a program; and
a hardware processor, wherein
the hardware processor is configured to execute the program to perform the following steps:

detecting a light-dark boundary region by using subject information relating to the subject; and generating output information according to the light-dark boundary region detected, and outputting the output information, wherein the subject information includes information obtained by performing, on the subject, first imaging and second imaging, the second imaging being performed with reflected light, which is irradiation light reflected by the subject, and the detecting of the light-dark boundary region comprises extracting, from a visible light image indicated in the subject information, only a boundary lying along a direction perpendicular to a direction of movement of the visible light image among boundaries between two regions having mutually different luminances, to detect the light-dark boundary region which is a region including the boundary extracted.

9. A non-transitory computer-readable recording medium having recorded thereon a program for causing a computer to execute the following steps:

detecting a light-dark boundary region by using subject information relating to the subject; and generating output information according to the light-dark boundary region detected, and outputting the output information, wherein the subject information includes information obtained by performing, on the subject, first imaging and second imaging, the second imaging being performed with reflected light, which is irradiation light reflected by the subject, and the detecting of the light-dark boundary region comprises extracting, from a visible light image indicated in the subject information, only a boundary lying along a direction perpendicular to a direction of movement of the visible light image among boundaries between two regions having mutually different luminances, to detect the light-dark boundary region which is a region including the boundary extracted.

\* \* \* \* \*